Patented Aug. 27, 1935

2,012,801

UNITED STATES PATENT OFFICE 2,012,801

PRODUCTION OF ALKYL DERIVATIVES OF AMMONIA

Leonid Andrussow, Mannheim, and Emil Germann, Ludwigshafen-on-the-Rhine, Germany, assignors to I. G. Farbenindustrie Aktiengesellschaft, Frankfort-on-the-Main, Germany No Drawing. Application January 31, 1934, Serial No. 709,170. In Germany February 7, 1933

6 Claims. (Cl. 260—128)

The present invention relates to improvements in the production of alkyl derivatives of ammonia.

It is already known that ammonia and primary or secondary amines can be converted into N-alkyl derivatives of ammonia by treatment with aliphatic alcohols in the presence of catalysts which split off water. The reaction products obtained are, however, frequently very non-uniform so that difficulty is encountered in working them up and, when employing higher alcohols than methanol, a considerable decomposition of the alcohols takes place readily by reason of the splitting off of a further molecule of water with the formation of ethylene or other olefines. For these reasons the said process has hitherto had no practical importance for the reaction of higher alcohols than methanol.

We have now found that N-alkyl derivatives of ammonia can be prepared advantageously by treating compounds selected from the group consisting of ammonia, primary and secondary amines, in particular aromatic amines, such as aniline at elevated temperatures, under superatmospheric pressures and in the presence of catalysts capable of splitting off water, with ethers containing at least one alkyl group having two or more carbon atoms. It has been found that by employing the said ethers instead of the corresponding higher alcohols, the alkylation proceeds much more rapidly and smoothly; lower temperatures and shorter times of reaction may be employed. Furthermore the formation of olefines is considerably reduced.

The reaction temperatures lie, generally speaking, between about 150° and about 450° C., preferably between 200° and 400° C. It is advantageous, generally speaking, to work at a superatmospheric pressure of 10 atmospheres or more. In this way the formation of olefines is strongly suppressed so that higher temperatures may be employed without the undesirable formation of olefines increasing appreciably; this is especially of advantage when working up amines which are difficult to alkylate.

Suitable catalysts are for example alumina gel, peptized or ordinary aluminium oxide, thorium oxide, cerium oxide, silica gel or mixtures thereof.

It is advantageous, especially when working in a cycle, to add the undesirable decomposition products which are sometimes formed, as for example olefines, to the reaction mixture or to allow them to become enriched therein. In this way the formation of olefines is still further suppressed.

Not only symmetrical ethers, but also mixed ethers containing an alkyl group having at least two carbon atoms may be employed. The other hydrocarbon group may belong to the aliphatic or aromatic series. When employing purely aliphatic mixed ethers, mixtures of the alkyl derivatives corresponding to the alkyl groups of the ethers are usually formed.

The technical advance achieved by the present invention may be seen from the fact that it renders it possible to prepare N-alkyl derivatives of ammonia in which the alkyl group contains two or more carbon atoms. In the preparation of such derivatives hitherto difficulty has frequently been encountered even in cases when the preparation of the corresponding N-methyl derivative may be readily carried out. For example N-diethylaniline can only be obtained in poor yields from aniline and ethyl alcohol by means of sulphuric acid although N-dimethylaniline may very readily and smoothly be obtained in an analogous manner from methanol. It has therefore been necessary to employ hydrochloric acid for the preparation of N-diethylaniline; this gives rise to a great danger of corrosion of the apparatus and consequent high costs. N-diethylaniline is readily obtained in a cheap manner according to this invention.

As already stated before, the process according to the present invention has the further advantage that by the employment of superatmospheric pressures the formation of olefines is strongly suppressed. Thus, when passing a mixture of 30 molecular proportions of aniline and 70 molecular proportions of diethyl ether at 290° C. with a velocity of flow of 40 liters of the vaporous mixture over 100 cubic centimeters of alumina gel per hour, from 20 to 23 per cent of ethylene with reference to the amount of the converted ether are formed. By the employment of superatmospheric pressure the formation of olefines is reduced to a small degree.

The following examples will further illustrate the nature of this invention but the invention is not restricted to these examples.

Example 1

2.5 kilograms of aniline and 5.6 kilograms of diethyl ether are led per hour over 1 liter of peptized aluminium oxide at 150 atmospheres pressure and 320° C. The product obtained consists of about one third of N monoethylaniline and two thirds of N diethylaniline. The amount of ethylene formed is only from 4 to 7 per cent. If 12 per cent of ethylene be added to the initial mixture, the formation of ethylene falls to less than 3 per cent calculated on the amount of ether consumed.

Similar results are obtained when treating aniline with dibutyl ether under the conditions described. Also in this case the employment of superatmospheric pressures effects a suppression of the formation of butylene.

*Example 2*

4 kilograms of a mixture consisting of 40 per cent by weight of N monoethylaniline and 60 per cent by weight of diethylaniline are treated per hour in the manner described in Example 1 with 5.6 kilograms of N diethyl ether. N diethylaniline containing only about 10 per cent of N monoethylaniline is obtained.

*Example 3*

A mixture of 93 grams of aniline and 296 grams of diethylether are passed at 320° C. over 600 cubic centimeters of peptized aluminium oxide. From 35 to 40 per cent of the diethyl ether are thereby decomposed, mainly with the formation of ethylene. The aniline is converted in an amount of only two thirds of the initial quantity into N mono- and N diethyl aniline.

If the said mixture of aniline and diethyl ether is passed at the said temperature of 320° C., but under a pressure of 20 atmospheres, over 100 cubic centimeters of the said catalyst, only from 7 to 8 per cent of the diethyl ether are decomposed into ethylene and only 1.5 per cent of the aniline employed remain unconverted.

What we claim is:—

1. A process for the production of N-alkyl derivatives of ammonia which comprises treating a compound selected from the group consisting of ammonia, primary and secondary amines at a temperature between about 150° and about 450° C., under superatmospheric pressure and in the presence of a catalyst promoting the splitting off of water with an ether containing at least one alkyl group having at least two carbon atoms.

2. In the process as claimed in claim 1 working at a temperature between 200° and 400° C.

3. In the process as claimed in claim 1 working at a pressure of at least 10 atmospheres.

4. A process for the production of N-alkyl derivatives of ammonia which comprises treating a compound selected from the group consisting of ammonia, primary and secondary amines with an ether containing at least one alkyl group having at least two carbon atoms at a temperature between 150° and 450° C., under a pressure of at least 10 atmospheres, in the presence of a catalyst promoting the splitting off of water and of an olefine capable of being formed by dehydration of the said ether.

5. A process for the production of aromatic N-alkyl derivatives of ammonia which comprises treating an aromatic amine at a temperature between 150° C. and 450° C., under superatmospheric pressure and in the presence of a catalyst promoting the splitting off of water with an ether containing at least one alkyl group having at least two carbon atoms.

6. In the process as claimed in claim 5, working under a pressure of at least 10 atmospheres.

LEONID ANDRUSSOW.
EMIL GERMANN.